(12) United States Patent
Howard et al.

(10) Patent No.: US 12,275,140 B2
(45) Date of Patent: Apr. 15, 2025

(54) ROBOTIC MANIPULATOR

(71) Applicant: Commonwealth Scientific and Industrial Research Organisation, Acton (AU)

(72) Inventors: David Howard, Acton (AU); James Brett, Acton (AU); Gary Delaney, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 571 days.

(21) Appl. No.: 17/616,463

(22) PCT Filed: Feb. 10, 2020

(86) PCT No.: PCT/AU2020/051059
§ 371 (c)(1),
(2) Date: Dec. 3, 2021

(87) PCT Pub. No.: WO2021/102502
PCT Pub. Date: Jun. 3, 2021

(65) Prior Publication Data
US 2022/0250261 A1 Aug. 11, 2022

(30) Foreign Application Priority Data
Nov. 29, 2019 (AU) ................. 2019904510

(51) Int. Cl.
*B25J 19/00* (2006.01)
*B25J 9/14* (2006.01)
(Continued)

(52) U.S. Cl.
CPC ............. *B25J 19/007* (2013.01); *B25J 9/142* (2013.01); *B25J 15/0616* (2013.01); *B25J 15/12* (2013.01);
(Continued)

(58) Field of Classification Search
CPC ..... B25J 9/00; B25J 9/142; B25J 15/00; B25J 15/0023; B25J 15/0616; B25J 15/12; B29C 64/393
(Continued)

(56) References Cited

U.S. PATENT DOCUMENTS 8,651,543 B2   2/2014 Matsuoka et al.
9,120,230 B2 * 9/2015 Lipson ..................... B25J 15/12
(Continued)

FOREIGN PATENT DOCUMENTS

CN      106003133 A      10/2016
DE   102012012289 A1 * 12/2012 .......... B25J 15/0023
(Continued)

OTHER PUBLICATIONS

H. M. Jaeger, "Toward jamming by design," Soft Matter 11, 12-27 (2015). L. K. Roth and H. M. Jaeger, "Optimizing packing fraction in granular media composed of overlapping spheres," Soft Matter ?12, 1107-1115 (2016).
(Continued)

*Primary Examiner* — Ronald D Hartman, Jr.
(74) *Attorney, Agent, or Firm* — Goodwin Procter LLP

(57) ABSTRACT

A method of manufacturing a robotic manipulator including determining desired manipulator properties including a manipulator shape and manipulator jamming properties; using the manipulator jamming properties and a packing computational model to determine a packing element configuration, the packing computational model defining relationships between manipulator jamming properties and different packing element configurations; controlling an additive printing machine based on the packing element configuration and manipulator shape to manufacture the robot manipulator. The robot manipulator includes a flexible outer skin defining a chamber; a connector attached to the
(Continued)

outer skin and connected to a fluid pump to allow fluid to be added to or removed from the chamber; filling elements disposed in the chamber according to the packing element configuration.

20 Claims, 10 Drawing Sheets

(51) Int. Cl.
  *B25J 15/06* (2006.01)
  *B25J 15/12* (2006.01)
  *B29C 64/393* (2017.01)
  B29L 31/00 (2006.01)
  B33Y 50/02 (2015.01)
  B33Y 80/00 (2015.01)
(52) U.S. Cl.
  CPC ....... *B29C 64/393* (2017.08); *B29L 2031/748* (2013.01); *B33Y 50/02* (2014.12); *B33Y 80/00* (2014.12)
(58) Field of Classification Search
  USPC .......................................................... 700/98
  See application file for complete search history.

(56) References Cited

U.S. PATENT DOCUMENTS

| | | | |
|---|---|---|---|
| 9,579,219 B2* | 2/2017 | Amend, Jr. | ............. A61F 2/586 |
| 9,962,832 B2* | 5/2018 | Kwok | ........................ B25J 9/14 |
| 2013/0106127 A1 | 5/2013 | Lipson et al. | |
| 2015/0272749 A1* | 10/2015 | Amend, Jr. | ............. A61F 2/588 |
| | | | 623/64 |
| 2018/0281199 A1 | 10/2018 | Bradway et al. | |
| 2019/0308331 A1* | 10/2019 | Hurwit | ................... B25J 9/1697 |

FOREIGN PATENT DOCUMENTS

| | | |
|---|---|---|
| JP | 2018158423 A | 10/2018 |
| WO | WO-2006082100 A1 | 8/2006 |
| WO | WO-2012034176 A1 | 3/2012 |
| WO | WO-2015006613 A1 * | 1/2015 .......... B25J 15/0023 |
| WO | WO-2015123128 A1 * | 8/2015 .......... B25J 15/0023 |
| WO | WO-2016172670 A1 | 10/2016 |
| WO | WO-2022014393 A1 * | 1/2022 |

OTHER PUBLICATIONS

Jiang, Allen, et al. "Robotic granular jamming: Does the membrane matter?." *Soft Robotics* 1.3 (2014): 192-201.
Brown, Eric, et al. "Universal robotic gripper based on the jamming of granular material." *Proceedings of the National Academy of Sciences* 107.44 (2010): 18809-18814.
Amend, John R., et al. "A positive pressure universal gripper based on the jamming of granular material." *IEEE Transactions on Robotics* 28.2 (2012): 341-350.
Cheng, Nadia G., et al. "Design and analysis of a robust, low-cost, highly articulated manipulator enabled by jamming of granular media." *2012 IEEE International Conference on Robotics and Automation.* IEEE, 2012.
Steltz, E., et al. "Jamming as an enabling technology for soft robotics." *Electroactive Polymer Actuators and Devices (EAPAD) 2010.* vol. 7642. International Society for Optics and Photonics, 2010.
Jiang, Allen, et al. "A variable stiffness joint by granular jamming." *ASME 2012 international design engineering technical conferences and computers and information in engineering conference.* American Society of Mechanical Engineers Digital Collection, 2013.
Steltz, Erik, et al. "Jsel: Jamming skin enabled locomotion." *2009 IEEE/RSJ International Conference on Intelligent Robots and Systems.* IEEE, 2009.
Cianchetti, Matteo, et al. "Soft robotics technologies to address shortcomings in today's minimally invasive surgery: the STIFF-FLOP approach." *Soft robotics* 1.2 (2014): 122-131.
Wall, Vincent, Raphael Deimel, and Oliver Brock. "Selective stiffening of soft actuators based on jamming." *2015 IEEE International Conference on Robotics and Automation (ICRA).* IEEE, 2015.
Hauser, Simon, et al. "Jammjoint: A variable stiffness device based on granular jamming for wearable joint support." *IEEE Robotics and Automation Letters* 2.2 (2017): 849-855.
Amend, John, et al. "Soft robotics commercialization: jamming grippers from research to product." *Soft robotics* 3.4 (2016): 213-222.

* cited by examiner

ROBOTIC MANIPULATOR

CROSS-REFERENCE TO RELATED APPLICATIONS

This patent application is a national stage entry and claims priority to and the benefit of PCT Patent Application Number PCT/AU2020/051059 entitled "Robotic Manipulator" filed on Oct. 2, 2020 which claims priority to and the benefit of Australian Patent Application Number 2019904510 entitled "Robotic Manipulator" filed on Nov. 29, 2019, the subject matter of which is incorporated by reference herein in its entirety.

BACKGROUND OF THE INVENTION

The present invention relates to a robotic manipulator, and in one particular example, a robotic jamming manipulator.

DESCRIPTION OF THE PRIOR ART

Robotic grippers are robotic end effectors for manipulating objects. Currently, robotic jamming grippers are provided for lifting arbitrarily-shaped objects. The robotic jamming gripper typically has a chamber connected to a vacuum pump, and a mass of granular material, such as coffee grounds or beads, dispersed inside the chamber. The number of coffee grounds or beads may be changed depending on the volume of the chamber to provide desirable gripping functions. The following publications describe prior robotic gripper functions and structures.

US20130106127 relates to a passive universal gripper including a mass of granular material encased in an elastic membrane. Using a combination of positive and negative pressure, the gripper can rapidly grip and release a wide range of objects that are typically challenging for conventional universal grippers, such as flat objects, soft objects, or objects with complex geometries. The gripper passively conforms to the shape of a target object, then vacuum-hardens to grip it rigidly; later using positive pressure to reverse this transition-releasing the object and returning to a deformable state. The apparatus and method enable the fast ejection of objects from the gripper, as well as essentially instantaneous reset time between releasing and gripping.

WO2016172670 relates to various improvements in soft robotic actuators, and more specifically the integration of stiff or rigid bodies into soft actuators to provide adjustable gripping behaviors. These actuators may be used as robotic end effectors to, for example, automate material handling processes. According to some embodiments, the actuators may be deployed in combination with a static or dynamic rigid structure, such as a rod. The rigid structure may extend beside or within the actuator. Multiple rigid structures may be deployed on the sides of an actuator, or multiple actuators may be deployed on the sides of a rigid structure. In further embodiments, an array or matrix of actuators may be integrated into a rigid structure, providing a low-profile gripper that can be maneuvered into tight spaces.

U.S. Pat. No. 8,651,543 relates to a grasping apparatus including a grasping portion for grasping a workpiece. This grasping portion has i) pawl portions having squeezing portions that squeeze the workpiece, and ii) contact portions, each of which has an inner bag made of elastic material, and a granular substance that is filled in the inner bag. The contact portions are attached to portions of the squeezing portions that contact the workpiece, and harden the granular substance while keeping it in an appropriate shape by increasing a volume ratio of the granular substance to an inner volume of the inner bags. Retaining portions that have concavo-convex shapes are formed on the attaching surfaces that are portions of the squeezing portions that the contact portions attach to.

The shapes, mechanical properties and surface interaction properties of the granular material are important to the gripping function, however, it is difficult to measure and/or independently control these parameters for a given granular material and as a result it is difficult to create grippers with desired gripping properties. Additionally, as grippers are typically manufactured manually, for example, by adding different quantities of granular material into an outer skin, it is also difficult to manufacture grippers consistently, leading to inconsistent and sometimes ineffective functionality. Furthermore, the durability of the gripper may be shortened as irregular-shaped granular material which may have undesirable surface interaction properties are constantly rubbed against the thin, flexible outer skin. It is difficult to extend the durability of the manipulator without compromising the function of the manipulator but as the grippers are manufactured manually, this results in high costs and difficulty in manufacture, which combined with the poor durability means there has been little practical uptake of jamming manipulators.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY OF THE PRESENT INVENTION

In one broad form an aspect of the present invention seeks to provide a method of manufacturing a robotic manipulator, wherein the method includes, in one or more processing devices: determining desired manipulator properties including a manipulator shape and manipulator jamming properties; using the manipulator jamming properties and a packing computational model to determine a packing element configuration, the packing computational model defining relationships between manipulator jamming properties and different packing element configurations, and the packing element configuration defining at least one of: a number of filling elements; filling element shapes; filling element sizes; filling element material composition; filling element surface roughness and roughness locations; and a proportion of filling elements of each size and shape; controlling an additive printing machine in accordance with the packing element configuration and manipulator shape to thereby manufacture the robot manipulator, wherein the robot manipulator includes: an outer skin, the skin being made of a flexible material and defining a chamber; a connector attached to the outer skin and configured to be connected to a fluid pump to allow fluid to be added to or removed from the chamber; filling elements disposed in the chamber in accordance with the packing element configuration.

In one embodiment the manipulator jamming properties include at least one of: a manipulator stiffness; and a manipulator jamming force.

In one embodiment the method includes, in the one or more processing devices, using the manipulator shape to determine the packing element configuration.

In one embodiment the packing element configuration defines filling element locations and wherein the method includes, in the one or more processing devices, positioning the filling elements within the chamber in accordance with the filling element locations.

In one embodiment the packing element configuration defines a mesh shape and location, and wherein the method includes, in the one or more processing devices, controlling the additive printing machine to create at least one mesh in accordance with the mesh shape and location.

In one embodiment the mesh is configured to retain filling elements in the filling element locations.

In one embodiment the method includes, in one or more processing devices: determining an outer skin configuration using the manipulator shape, the outer skin configuration defining at least one of: outer skin shape; outer skin size; outer skin material; outer skin flexibility; outer skin structure; outer skin surface feature; and controlling the additive printing machine in accordance with the outer skin configuration to manufacture the outer skin of the robotic manipulator.

In one embodiment the method includes, in the one or more processing devices, selecting a manipulator shape at least one of: in accordance with user input commands; from a number of predefined shapes; and in accordance with an intended manipulator use.

In one embodiment the method includes, in the one or more processing devices: determining manipulator use parameters based on an intended manipulator use; and determining the manipulator properties using the manipulator use parameters.

In one embodiment the method includes, in the one or more processing devices, using the manipulator use parameters and a manipulator computational model to determine at least some of the manipulator properties, the manipulator computational model defining relationships between manipulator use parameters and different manipulator properties.

In one embodiment, for lifting an object, the manipulator use parameters include at least one of: an object size; an object type; an object weight; an object shape; and an object surface properties.

In one embodiment the method includes, in one or more processing devices, controlling the additive printing machine to create a filter to retain filling elements within the chamber as fluid is added to or removed from the chamber.

In one embodiment the method includes, in one or more processing devices, controlling the additive printing machine to laminate the outer skin onto the connector.

In one embodiment the method includes, in one or more processing devices, controlling the additive printing machine to manufacture filling elements from a photopolymer.

In one embodiment the method includes, in one or more processing devices, determining the packing element configuration by defining the filling element shapes, wherein the filling element shapes include superquadrics.

In one broad form an aspect of the present invention seeks to provide a system for use in manufacturing a robotic manipulator, the system including one or more processing devices configured to: determine desired manipulator properties including a manipulator shape and manipulator jamming properties; use the manipulator jamming properties and a packing computational model to determine a packing element configuration, the packing computational model defining relationships between manipulator jamming properties and different packing element configurations, and the packing element configuration defining: a number of filling elements; filling element shapes; filling element sizes; filling element material composition; filling element surface roughness and roughness locations; and a proportion of filling elements of each size and shape; control an additive printing machine in accordance with the packing element configuration and manipulator shape to thereby manufacture the robot manipulator, wherein the robot manipulator includes: an outer skin, the skin being made of a flexible material and defining a chamber; a connector attached to the outer skin and configured to be connected to a fluid pump to allow fluid to be added to or removed from the chamber; filling elements disposed in the chamber in accordance with the packing element configuration.

In one embodiment the manipulator jamming properties include at least one of: a manipulator stiffness; and a manipulator jamming force.

In one embodiment the one or more processing devices are configured to use the manipulator shape to determine the packing element configuration.

In one embodiment the packing element configuration defines filling element locations and wherein the one or more processing devices are configured to position the filling elements within the chamber in accordance with the filling element locations.

In one embodiment the packing element configuration defines a mesh shape and location, and wherein the one or more processing devices are configured to control the additive printing machine to create at least one mesh in accordance with the mesh shape and location.

In one embodiment the mesh is configured to retain filling elements in the filling element locations.

In one embodiment the one or more processing devices are configured to: determine an outer skin configuration using the manipulator shape, the outer skin configuration defining at least one of: outer skin shape; outer skin size; outer skin material; outer skin flexibility; outer skin structure; outer skin surface feature; and control the additive printing machine in accordance with the outer skin configuration to manufacture the outer skin of the robotic manipulator.

In one embodiment the one or more processing devices are configured to select a manipulator shape at least one of: in accordance with user input commands; from a number of predefined shapes; and in accordance with an intended manipulator use.

In one embodiment the one or more processing devices are configured to: determine manipulator use parameters based on an intended manipulator use; and determine the gripper properties using the manipulator use parameters.

In one embodiment the one or more processing devices are configured to use the manipulator use parameters and a manipulator computational model to determine at least some of the manipulator properties, the manipulator computational model defining relationships between manipulator use parameters and different manipulator properties.

In one embodiment, for lifting an object, the manipulator use parameters include at least one of: an object size; an object type; an object weight; an object shape; and an object surface properties.

In one embodiment the one or more processing devices are configured to control the additive printing machine to manufacture the robot manipulator, wherein the robot manipulator including the connector further includes a filter to retain filling elements within the chamber as fluid is added to or removed from the chamber.

In one embodiment the one or more processing devices are configured to control the additive printing machine to manufacture the robot manipulator, wherein the robot manipulator includes the outer skin being laminated onto the connector.

In one embodiment the one or more processing devices are configured to determine a packing element configuration defining filling element shapes, wherein the filling element shapes include superquadrics.

In one broad form an aspect of the present invention seeks to provide a robotic manipulator including: an outer skin, the skin being made of a flexible material and defining a chamber; a connector attached to the outer skin and configured to be connected to a fluid pump to allow fluid to be added to or removed from the chamber; filling elements disposed in the chamber in accordance with a packing element configuration, characterised in that the robotic manipulator is manufactured using a single run additive manufacturing process.

In one embodiment the packing element configuration defining: a number of filling elements; filling element shapes; filling element sizes; filling element material composition; filling element surface roughness and roughness locations; and a proportion of filling elements of each size and shape.

In one embodiment the packing element configuration defines filling element locations.

In one embodiment the packing element configuration defines a mesh shape and location.

In one embodiment the mesh is configured to retain filling elements in the filling element locations.

In one embodiment an outer skin configuration is determined by using a manipulator shape, and the outer skin configuration defining at least one of: outer skin shape; outer skin size; outer skin material; outer skin flexibility; outer skin structure; and outer skin surface feature.

In one embodiment the manipulator shape is selected at least one of: in accordance with user input commands; from a number of predefined shapes; and in accordance with an intended manipulator use.

In one embodiment the connector includes a filter to retain filling elements within the chamber as fluid is added to or removed from the chamber.

In one embodiment the outer skin is laminated onto the connector.

In one embodiment the filling elements are at least partially made of photopolymer material.

In one embodiment the filling element shapes include superquadrics.

In one embodiment the outer skin material includes any one of rubber, latex, silicone and polyurethane.

In one embodiment the filter is at least partially made of ABS or polyethylene.

In one embodiment the mesh is at least partially made of ABS or polyethylene.

In one broad form an aspect of the present invention seeks to provide a method of manufacturing a robotic manipulator, the method including using a single run additive manufacturing process to manufacture: an outer skin defining a chamber, the skin being made of a flexible material and defining a chamber; a connector configured to be connected to a fluid pump to allow fluid to be added to or removed from the chamber; filling elements disposed in the chamber in accordance with a packing element configuration.

In one embodiment the method further includes: providing a support material during the single run additive manufacturing process; and, removing the support material.

In one embodiment the method of removing the support material includes at least one of: dissolving the support material; flushing the cavity with a solvent; and blasting off the support material.

In one embodiment the packing element configuration defining at least one of: a number of filling elements; filling element shapes; filling element sizes; filling element material composition; filling element surface roughness and roughness locations; and a proportion of filling elements of each size and shape.

In one embodiment the packing element configuration defines filling element locations.

In one embodiment the packing element configuration defines a mesh shape and location.

In one embodiment the mesh is configured to retain filling elements in the filling element locations.

In one embodiment an outer skin configuration is determined by using a manipulator shape, and the outer skin configuration defining at least one of: outer skin shape; outer skin size; outer skin material; outer skin flexibility; and outer skin surface feature.

In one embodiment the connector includes a filter to retain filling elements within the chamber as fluid is added to or removed from the chamber.

In one embodiment the outer skin is laminated onto the connector.

In one embodiment the filling elements are at least partially made of photopolymer material.

In one embodiment the filling element shapes include superquadrics.

In one embodiment the outer skin material includes any one of rubber, latex, silicone or polyurethane.

In one embodiment the filter is at least partially made of ABS or polyethylene.

In one embodiment the mesh is at least partially made of ABS or polyethylene.

In one broad form an aspect of the present invention seeks to provide a computer program product for use in manufacturing a robotic manipulator, the computer program product including computer executable code, which when executed by one or more processing devices, causes the one or more processing devices to: determining desired manipulator properties including a manipulator shape and manipulator jamming properties; using the manipulator jamming properties and a packing computational model to determine a packing element configuration, the packing computational model defining relationships between manipulator jamming properties and different packing element configurations, and the packing element configuration defining at least one of: a number of filling elements; filling element shapes; filling element sizes; filling element material composition; filling element surface roughness and roughness locations; and a proportion of filling elements of each size and shape; controlling an additive printing machine in accordance with the packing element configuration and manipulator shape to thereby manufacture the robot manipulator, wherein the robot manipulator includes: an outer skin, the skin being made of a flexible material and defining a chamber; a connector attached to the outer skin and configured to be connected to a fluid pump to allow fluid to be added to or removed from the chamber; filling elements disposed in the chamber in accordance with the packing element configuration.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which.

DETAILED DESCRIPTION OF THE PREFERRED EMBODIMENTS

Figure 1:
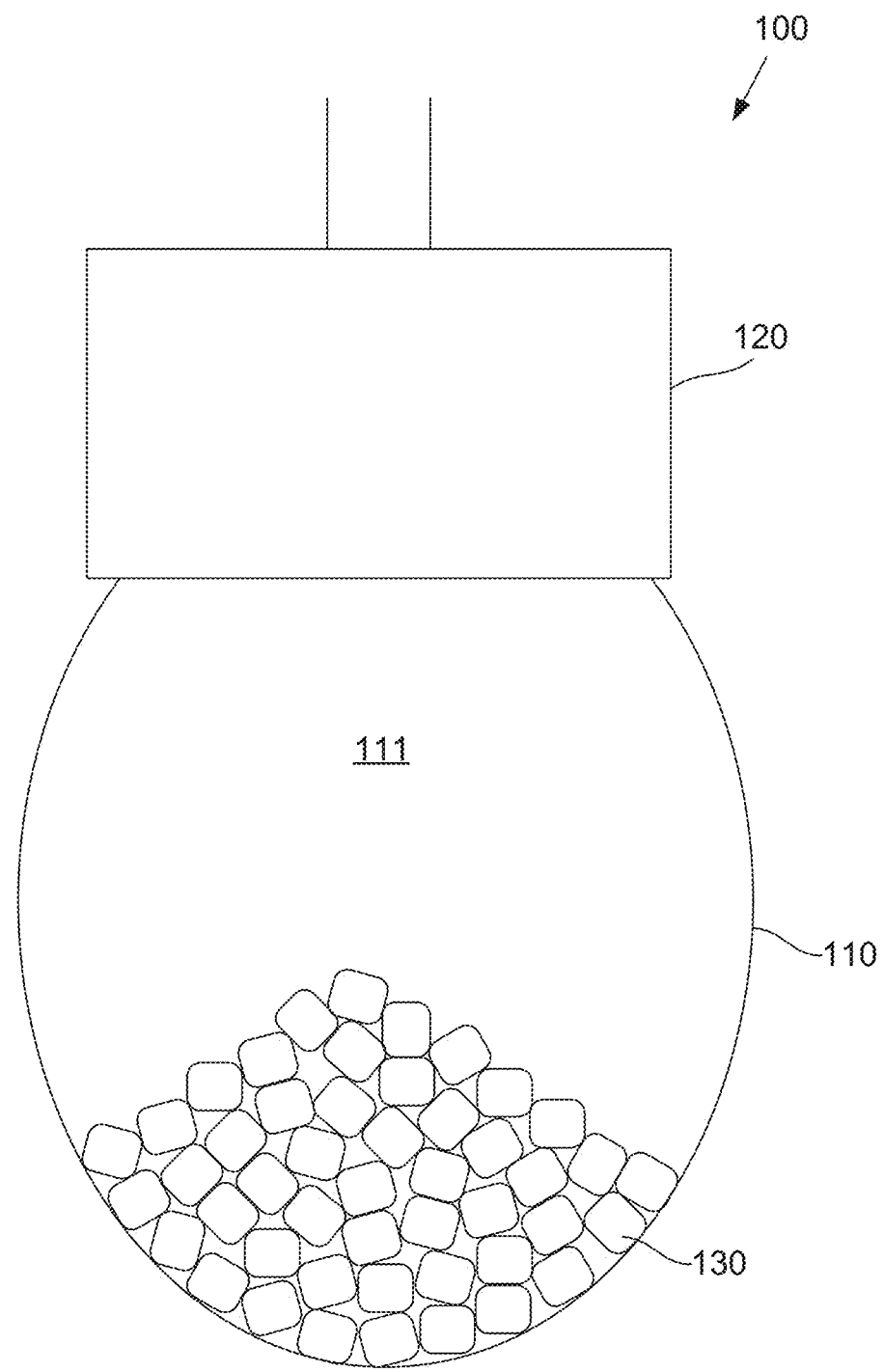
FIG. 1 is a schematic diagram of an example of a robotic manipulator.

An example of a robotic manipulator will now be described with reference to FIG. 1.

A robotic manipulator 100 includes an outer skin 110, a connector 120 and filling elements 130. The outer skin 110 is made of a flexible material and defines a chamber 111. The connector 120 is attached to the outer skin 110 and configured to be connected to a fluid source or sink, such as a pump (not shown) to allow fluid to be added to or removed from the chamber 111. The filling elements 130 are deposited in the chamber 111 in accordance with a packing element configuration. The robotic manipulator 100 is manufactured using a single run additive manufacturing process.

When in operation, the robotic manipulator 100 is in a first state, typically with the chamber substantially at atmospheric pressure, such that the filling elements 130 are able to move freely in the chamber 111. The robotic manipulator 100 is placed on an object to be lifted and deformed to wrap around the object. The fluid pump subsequently removes fluid from the chamber 111, so that the robotic manipulator 100 transforms to a second state, at a pressure below atmospheric pressure. In this second state, the skin 110 is urged against the filling elements 130 by the atmospheric pressure outside the skin, resulting in the filling elements being held in a substantially fixed in position within the chamber 111 to thereby apply a manipulator jamming force on the object. This allows the object to be manipulated, for example to lift the object, to allow engagement with the object, for example to grip a static object during locomotion of a movable robot.

Figure 2:
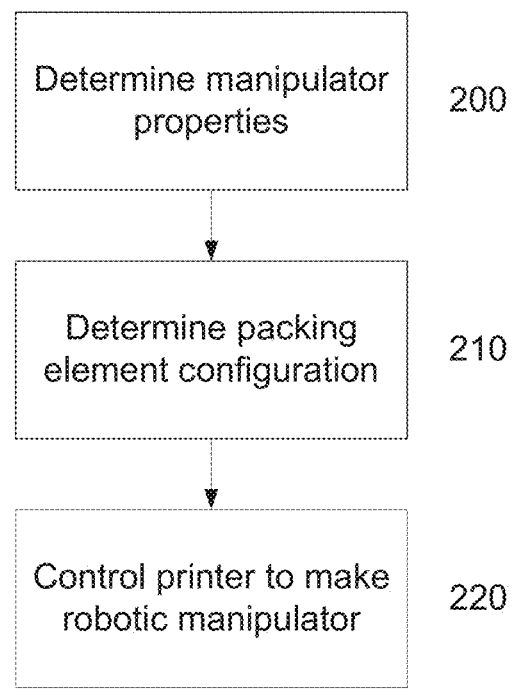
FIG. 2 is a flow chart of an example of a manufacturing method of a robotic manipulator.

An example of a method of manufacturing the robotic manipulator 100 will now be described with reference to FIG. 2.

For the purpose of illustration, it is assumed that the process is performed at least in part using one or more electronic processing devices forming part of one or more processing systems, such as computer systems, servers, or the like, which may in turn be connected to one or more client devices, such as mobile phones, portable computers, tablets, or the like, via a network architecture, as will be described in more detail below. For ease of illustration the remaining description will refer to a processing device, but it will be appreciated that multiple processing devices could be used, with processing distributed between the devices as needed, and that reference to the singular encompasses the plural arrangement and vice versa.

At step 200, the one or more processing devices determine desired manipulator properties. The manipulator properties include a manipulator shape and manipulator jamming properties, and may also include other properties, as will be described in more detail below. The manner in which the properties are determined will vary depending on the preferred implementation, but typically these are determined based on an intended application of the robotic manipulator, either manually by having the user specify the properties, or by calculating properties based on the usage.

At step 210, the one or more processing devices use the manipulator jamming properties and a packing computational model to determine a packing element configuration. The packing element configuration typically defines properties of filling elements, such as granular objects, that are to be provided within the manipulator, such as a number of filling elements, filling element shapes, filling element sizes, filling element material composition, filling element surface roughness and/or a proportion of filling elements of each size and shape. The filling element material composition may further include a filling element deformability, density and/or coefficient of restitution. The filling element surface roughness may include different surface roughness in different locations of a filling element. In one example, a filling element of a cubical shape has six sides including one rough side and five smooth sides. The packing element configuration therefore controls the properties the manipulator will have once constructed and in this regard, the packing computational model defining relationships between manipulator jamming properties and different packing element configurations. The computational model can be derived by analysing manipulator jamming properties from multiple packing element configurations.

In one example, this is performed using machine learning, for example, by training a reference model using manipulator jamming properties from one or more different robotic manipulators. The nature of the model and the training performed can be of any appropriate form and could include any one or more of decision tree learning, random forest, logistic regression, association rule learning, artificial neural networks, deep learning, inductive logic programming, support vector machines, clustering, Bayesian networks, reinforcement learning, representation learning, similarity and metric learning, genetic algorithms, rule-based machine learning, learning classifier systems, or the like. As such schemes are known, these will not be described in any further detail.

In one example, this can include training a single model to determine the packing element configuration using manipulator jamming properties, although this is not essential and other approaches could be used. By using machine learning, this can improve the accuracy and efficiency of determination and also expand the complexity of the determination. In this example, the packing element configuration may define a number of filling elements, filling element shapes, filling element sizes, and a proportion of filling elements of each size and shape.

Thus, it will be appreciated that different packing element configurations may be preferred for engaging different objects. By way of example, a packing element configuration is determined by using a packing computational model to lift a glass might specify that the manipulator include two hundred sphere filling elements created using a given material with specified controlled surface roughness, and three hundred cube filling elements using a different material and specified controlled surface roughness. The packing element configuration further defines the sphere filling element is of 1 mm in diameter and the cube filling element is 1 $mm^3$ in size.

At step 220, the one or more processing devices, control an additive printing machine in accordance with the packing element configuration and manipulator shape to thereby manufacture the robot manipulator 100. Thus, for example, the robotic manipulator can be made by having the precise packing element configuration used to control a three-dimensional (3D) printer, allowing a manipulator to be manufactured including the outer skin 110, connector 120 and filling elements 130.

The robotic manipulator being manufactured by single run additive manufacturing process allows robotic manipulator to have a precise predetermined packing element configuration, and thereby delivers optimal manipulator properties. Furthermore, the packing element configuration is determined by computational model, so that desirable manipulator properties can be better translated to packing element configurations to be manufactured. Advantageously, additive manufacturing processes allow manufacturing cost and time to be reduced. As the cost and time is reduced, it may not be a priority to extend the durability of the manipulator, so that an optimal manipulator function can be delivered. Alternatively, the durability of the manipulator may be extended by printing the filling element shapes with rounded corners and/or slightly thicker outer skin. Additive manufacturing processes also reduce manufacturing errors or minimise quality control spend. Accordingly, the robotic manipulator can be replaced or repaired easily by printing an entire manipulator or a part of the manipulator. This allows the manipulators to be designed and manufactured to be more effective to the intended application and manufactured more easily, allowing these to be deployed more widely.

A number of further features will now be described.

In one example, the manipulator jamming properties may include a manipulator stiffness and/or manipulator jamming force. In this regard, the manipulator stiffness defines the stiffness of the robotic manipulator prior to the fluid being removed from the chamber, which is relevant to how much the manipulator can be deformed in order to engage with an object. For example, a manipulator with a low stiffness can undergo greater deformation, allowing this to grip or manipulate a variety of different shaped objects. The manipulator jamming force defines the force applied to the object by the manipulator, and hence in effect, defines the force applied when fluid is removed from the chamber. In one example, the manipulator stiffness and the manipulator jamming force are used by the packing computational model to determine the packing element configuration. Thus, the packing computational model can define a relationship between different packing configurations and the resulting manipulator stiffness and/or jamming force.

Additionally, the packing element configuration may be determined based on the manipulator shape. Thus, different shape manipulators could be used for different applications, such as gripping different shaped objects to allow objects to be lifted and/or to allow an object and/or surface to be gripped for locomotion. Thus, in one example, the method further includes selecting a manipulator shape. The selection can be made manually, in accordance with user input commands, or could involve selecting from a number of predefined shapes, or could be performed based on an intended manipulator use.

The packing element configuration may further define filling element locations, allowing different packing configurations to be used within different parts of a manipulator. For example, this can allow a manipulator to include portions with different stiffness and/or jamming forces, which can be useful to enable effective gripping of objects to be performed.

In the event that filling element locations are defined, the manufacturing method can include positioning the filling elements within the chamber in accordance with the filling element locations. Each filling elements may have a preferred location in the chamber, the location may be defined based on the size and/or shape of the filling element. The robotic manipulator with preferred locations of the filling element may better provide the referred packing element configuration.

The packing element configuration may further define a mesh shape and location. In this example, the manufacturing method includes controlling the additive printing machine to create a mesh in accordance with the mesh shape and location. In one example, the mesh is located between filling elements. In this example, the chamber is divided into multiple sub-chambers by one or more meshes, and each sub-chamber accommodates a subset of filling elements. This allows the filling elements to be retained in desired filling element locations according to the packing element configuration, and hence improve effectiveness. In one example, the mesh may be in a part of the chamber that is not occupied by filling elements. This also allows the filling element to be constrained in a part of the chamber and hence provide different manipulator jamming properties in different parts of the manipulator. Thus for example, one part of the jamming manipulator could be made with a low stiffness, allowing it to easily deform and surround an object, whilst other parts could be configured to apply a high jamming force and thereby secure the object. The mesh may also have different material properties to the filling elements and may further contributes to providing the preferred packing element configuration.

It will be appreciated from this, that in one example, the packing element configuration might be no more than filling element properties, but in other examples, this might include filling element properties in conjunction with other factors that influence packing, such as packing orders, structural features inside the chamber, or the like.

The manufacturing method of the robotic manipulator may further include determining an outer skin configuration using the manipulator shape and controlling the additive printing machine in accordance with the outer skin configuration to manufacture the outer skin of the robotic manipulator. By controlling the additive printing machine to manufacture the outer skin, the method allows the robotic manipulator as a whole be manufactured in a single print run. In one example, the outer skin configuration may define outer skin shape, outer skin size, outer skin material, outer skin flexibility, variation in outer skin structure, and outer skin surface feature. This further allows manipulator properties of the robotic manipulator to be further defined and manufactured accordingly.

In one example, the manipulator use parameters may be determined based on an intended manipulator use. Thus, the manipulator use parameters define parameters regarding the manipulator use, so for example when lifting an object, the manipulator use parameters may include an object size, an object type, an object weight, an object shape and/or an object surface properties, such as a surface friction and/or strength.

The manipulator use properties can then be used to determine the manipulator properties, allowing different manipulator properties to be implemented for different uses, such as lifting objects, walking robotic grippers, or the like. The manipulator properties could be defined manually, as previously described, but more advantageously, this could be performed using a manipulator computational model defining relationships between manipulator use parameters and different manipulator properties. In one example, this is performed using machine learning similarly to the machine learning technique described previously. Accordingly, this improves the accuracy and efficiency of determination and also expand the complexity of the determination.

In one example, the connector includes a filter to retain filling elements within the chamber as fluid is added to or removed from the chamber. The manufacturing method of the robotic manipulator may further include controlling the additive printing machine to create a filter. The filter allows the filling elements to remain in the chamber when the robotic manipulator is in operation. The nature of the filter will vary depending on the preferred implementation, but this could include a mesh having openings smaller than the smallest filling elements.

In one example, the outer skin is laminated onto the connector. This allows the outer skin to be better bonded with the connector, and hence increases the durability of the robotic manipulator.

The filling element shapes include superquadrics. In one example, the superquadrics may be defined by one or more parameters, such as a shape parameter and/or aspect ratio. It will be appreciated however that this is not intended to be limiting and could include other properties.

In one example, the filling elements are at least partially made of photopolymer material, such as Augilus30 and Vero. The outer skin material may include rubber, latex, silicone and polyurethane. The filter may be at least partially made of ABS, polyethylene or any other suitable material. The mesh may be at least partially made of ABS, polyethylene, polyurethane or any other suitable material.

In one example, the manufacturing method may further include providing a support material during the single run additive manufacturing process, and removing the support material. The support material may be removed by dissolving the support material, flushing the cavity with a solvent, and/or blasting off the support material. The support material allows the filling elements to be manufactured inside the chamber when the outer skin is of limited flexibility. The support material also allows the robotic manipulator to be manufactured with a high degree of complexity, such as complicated three-dimensional shape that cannot be manufactured by moulding.

Figure 3:
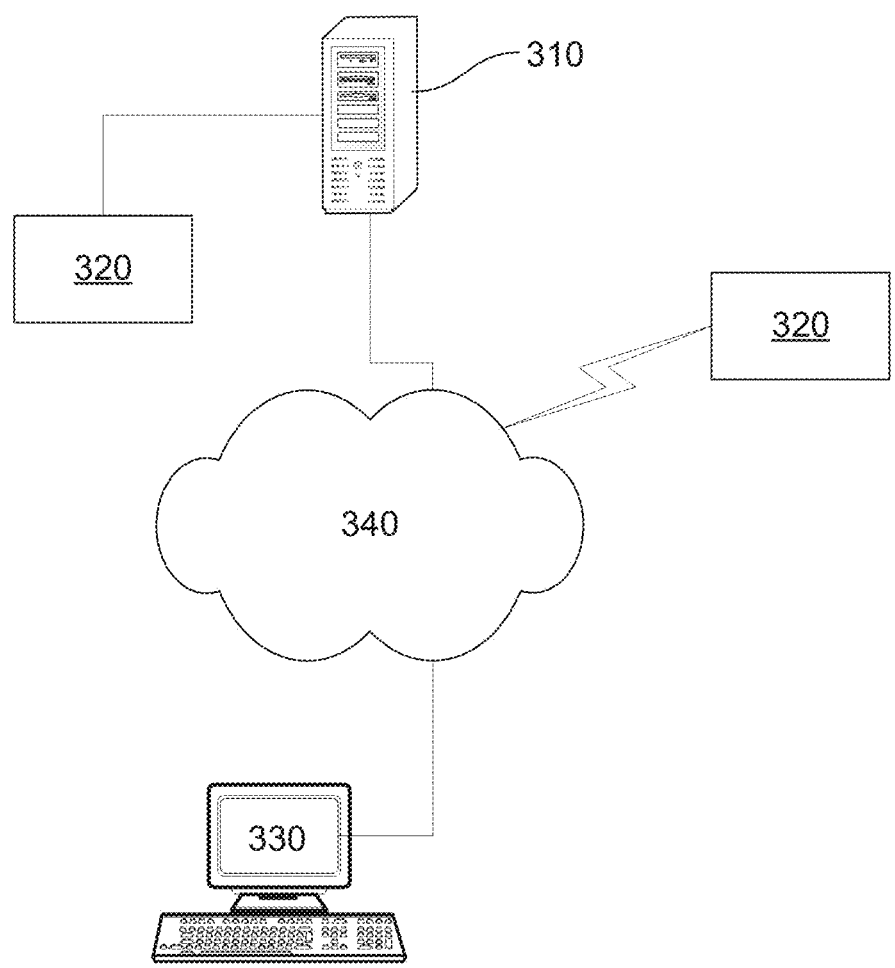
FIG. 3 is a schematic diagram of an example of a network architecture.

An example of a system for use in manufacturing a robotic manipulator will now be described in more detail with reference to FIG. 3.

In this example, one or more processing devices 310 are provided and coupled to one or more additive printing machines 320, via one or more communications networks 340, such as the Internet, and/or a number of local area networks (LANs). A number of additive printing machines 320, as described above, are provided, with these optionally being connected directly to the processing device 310 via the communications networks 340. The client device 330 interfaces with and control the processing devices 310 and/or printers 320.

Any number of processing devices 310, additive printing machines 320 and client devices 330 could be provided, and the current representation is for the purpose of illustration only. The configuration of the networks 340 is also for the purpose of example only, and in practice the processing devices 310, additive printing machines 320 and client devices 330 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In this example, the processing devices 310 are adapted to determine the packing element configuration and control the additive printing machines 320, allowing robotic manipulators to be printed. Whilst the processing devices 310 are shown as single entities, it will be appreciated they could include a number of processing devices distributed over a number of geographically separate locations, for example as part of a cloud based environment. Thus, the above described arrangements are not essential and other suitable configurations could be used.

Figure 4:
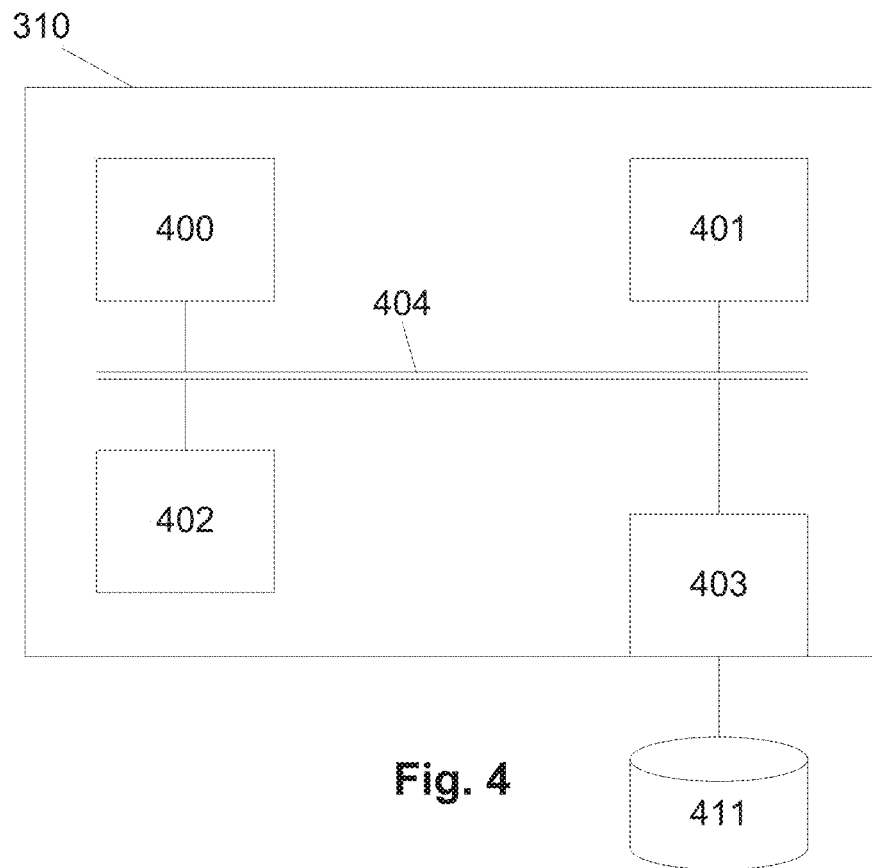
FIG. 4 is a schematic diagram of an example of a processing device.

An example of a suitable processing device 310 is shown in FIG. 4. In this example, the processing device 310 includes at least one microprocessor 400, a memory 401, an optional input/output device 402, such as a keyboard and/or display, and an external interface 403, interconnected via a bus 404 as shown. In this example the external interface 403 can be utilised for connecting the processing device 310 to peripheral devices, such as the communications networks 340, databases 411, other storage devices, or the like. Although a single external interface 403 is shown, this is for the purpose of example only, and in practice multiple interfaces using various methods (e.g. Ethernet, serial, USB, wireless or the like) may be provided.

In use, the microprocessor 400 executes instructions in the form of applications software stored in the memory 401 to allow the required processes to be performed. The applications software may include one or more software modules, and may be executed in a suitable execution environment, such as an operating system environment, or the like.

Accordingly, it will be appreciated that the processing system 400 may be formed from any suitable processing system, such as a suitably programmed PC, web server, network server, or the like. In one particular example, the processing system 400 is a standard processing system such as an Intel Architecture based processing system, which executes software applications stored on non-volatile (e.g., hard disk) storage, although this is not essential. However, it will also be understood that the processing device could be any electronic processing device such as a microprocessor, microchip processor, logic gate configuration, firmware optionally associated with implementing logic such as an FPGA (Field Programmable Gate Array), or any other electronic device, system or arrangement.

Figure 5:
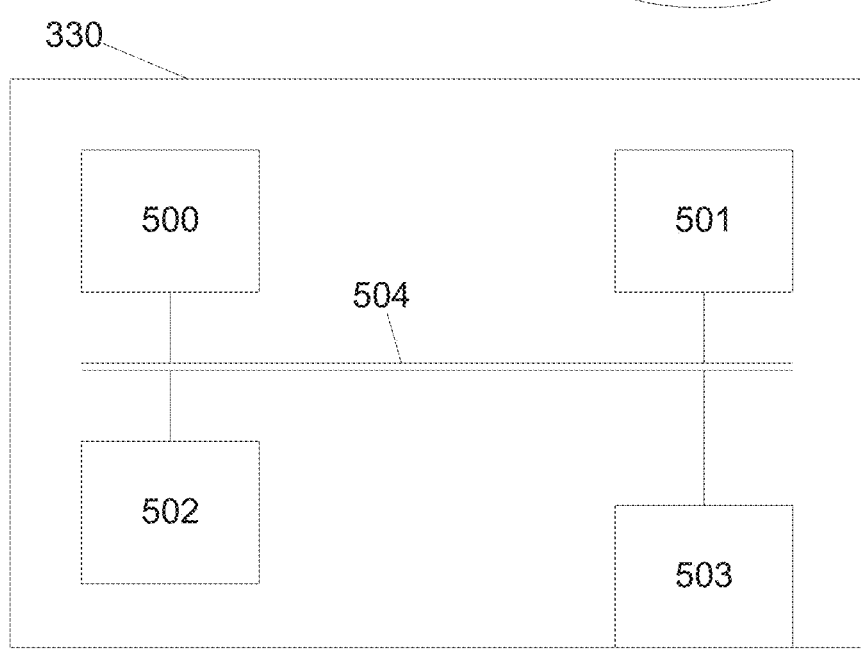
FIG. 5 is a schematic diagram of an example of an intermediate communication devices device.

As shown in FIG. 5, in one example, the client device 330 includes at least one microprocessor 500, a memory 501, an input/output device 502, such as a keyboard and/or display, an external interface 503, interconnected via a bus 504 as shown. In this example the external interface 503 can be utilised for connecting the client device 330 to peripheral devices, such as the communications networks 340, databases, other storage devices, or the like. Although a single external interface 503 is shown, this is for the purpose of example only, and in practice multiple interfaces using various methods (e.g. Ethernet, serial, USB, wireless or the like) may be provided.

In use, the microprocessor 500 executes instructions in the form of applications software stored in the memory 501, and to allow communication with one of the processing devices 310 and/or additive printing machines 320.

Accordingly, it will be appreciated that the client device 330 be formed from any suitably programmed processing system and could include suitably programmed PCs, Internet terminal, lap-top, or hand-held PC, a tablet, a smart phone, or the like. However, it will also be understood that the client device 330 can be any electronic processing device such as a microprocessor, microchip processor, logic gate configuration, firmware optionally associated with implementing logic such as an FPGA (Field Programmable Gate Array), or any other electronic device, system or arrangement.

Examples of the processes for manufacturing a robotic manipulator will now be described in further detail. For the purpose of these examples it is assumed that one or more respective processing devices 310 are servers adapted to receive manipulator properties, and determine packing element configuration. The servers 310 typically execute processing device software, allowing relevant actions to be performed, with actions performed by the server 310 being performed by the processor 400 in accordance with instructions stored as applications software in the memory 401 and/or input commands received from a user via the I/O device 402. It will also be assumed that actions performed by the client devices 330, are performed by the processor 500 in accordance with instructions stored as applications software in the memory 501 and/or input commands received from a user via the I/O device 502, whilst actions performed by the additive printing machines 320, are performed by the processor 400 in accordance with instructions stored as applications software in the memory 401 and/or input commands received from a user.

However, it will be appreciated that the above described configuration assumed for the purpose of the following examples is not essential, and numerous other configurations may be used. It will also be appreciated that the partitioning of functionality between the different processing systems may vary, depending on the particular implementation.

Figure 6A:
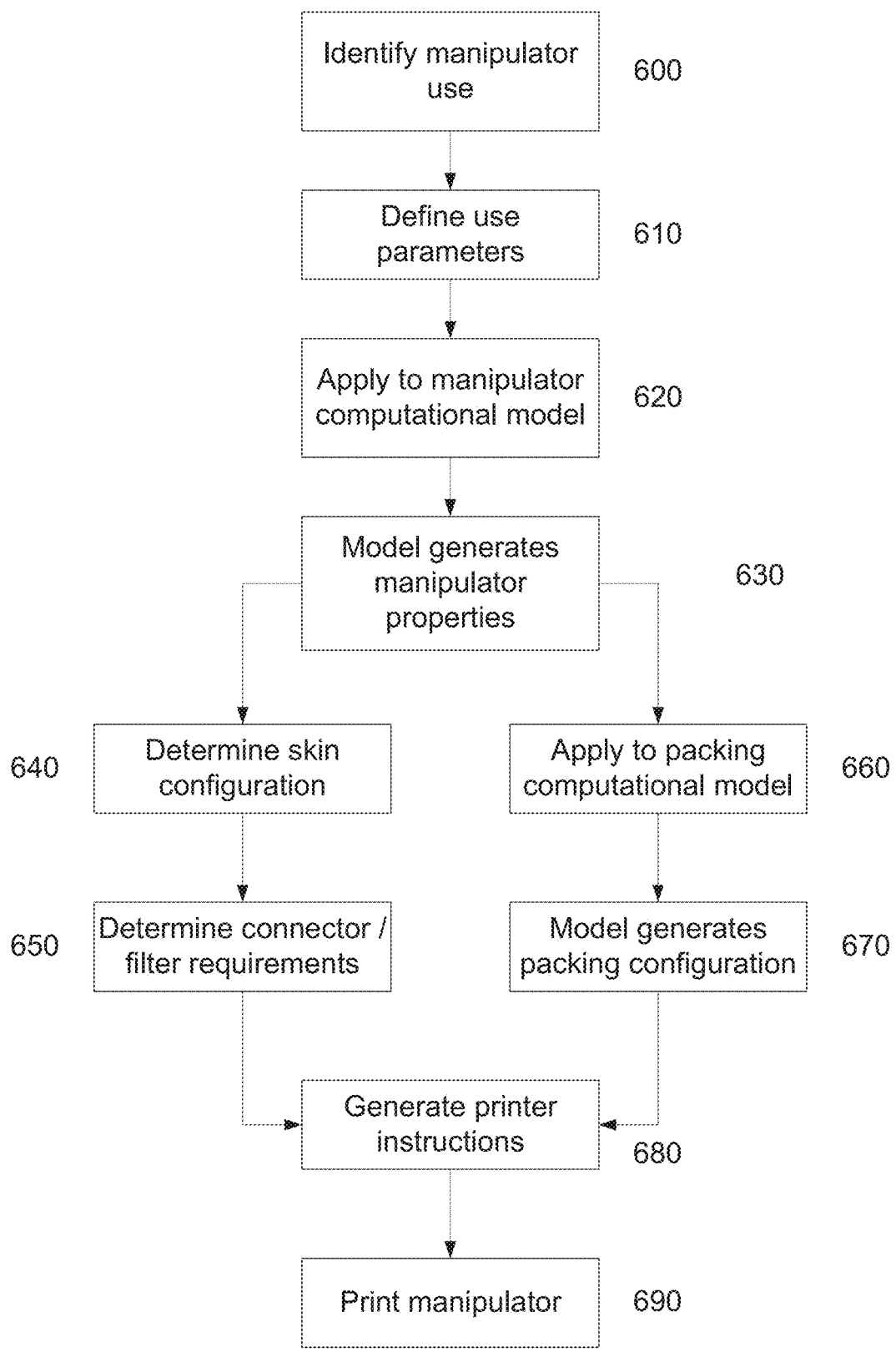
FIG. 6A is a flow chart of an example of a manufacturing method of a robotic manipulator.

A method of manufacturing the robotic manipulator will now be described with reference to FIG. 6A.

At step 600, the manipulator use is identified. The manipulator use may be identified to be lifting objects, locomotion or squeezing. Subsequently, manipulator use parameters are defined at step 610 based on the manipulator use. In the example of lifting objects, the use parameters may include size, type, weight, shape, and/or surface properties of the object to be lifted. In another example of locomotion, the use parameters may include roughness and/or conditions such as wet/dry of the surface to be walked on.

At step 620, the use parameters are applied to a manipulator computational model, which generates manipulator properties at step 630. Manipulator properties include a manipulator shape and manipulator jamming properties, such as stiffness, jamming force, or the like. Whilst a single model is described, this is not essential and different models could be used, for example to generate the manipulator shape and jamming properties respectively.

At step 640, skin configuration is determined based on the gripper shape. Additionally, at step 650, connector and/or filter requirements are determined based on the manipulator shape. The manipulator jamming properties, and optionally the manipulator shape, are applied to a packing computational model, at step 660. The packing computational model, at step 670, generates packing configuration of the robotic manipulator. According to the packing configuration, the skin configuration, connector and/or filter requirements, a set of printing instructions for the 3D printer is generated at step 680. The set of printing instructions is then sent to the 3D printer which prints the robotic manipulator, at step 690.

During the printing of the robotic manipulator, the 3D printer may print support material to support the manipulator structure. The support material may be printed in the chamber to support the filling elements or printed on the exterior of the manipulator to support the outer skin. The support material is removed after the 3D printer completes printing the robotic manipulator. Depending on the types of support material, the support material may be removed via bathing the manipulator in a heated solvent, flushing the chamber with a solvent, and/or blasting the manipulator with pressurised fluid.

Figure 6B:
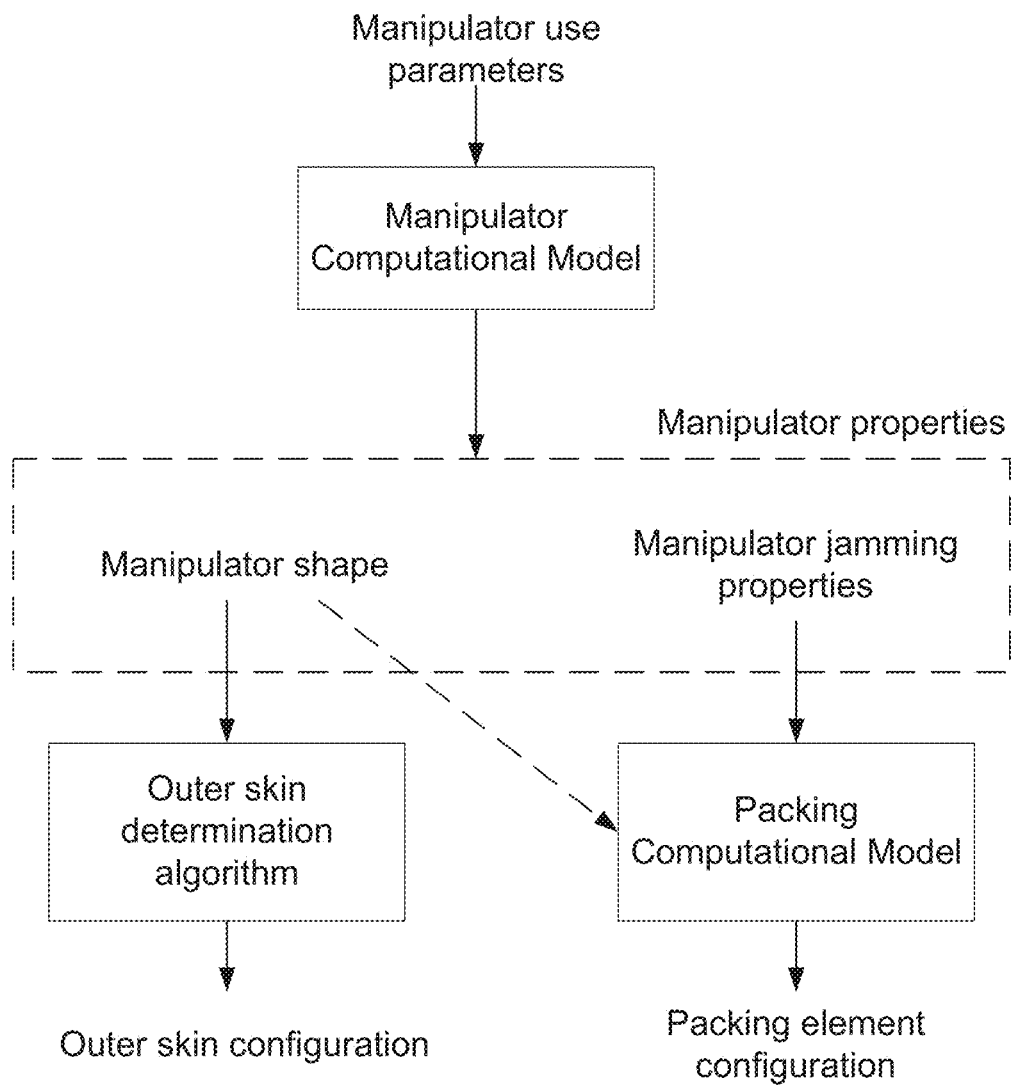
FIG. 6B is a block diagram of computational models and corresponding input/output according to the method described in FIG. 6A.

The above method of manufacturing will now be described in detail with reference to FIG. 6B.

At the corresponding step 610, manipulator use parameters are defined and input to the manipulator computational model at step 620. The manipulator computational model outputs manipulator properties including manipulation shape and manipulator jamming properties. The manipulator shape is input to an outer skin determination algorithm or an outer skin computational model, which outputs out skin configuration at step 640. The manipulator jamming properties are input to a packing computational model at step 660, and the packing computational model generates packing element configuration at step 670. The manipulator shape may be optionally provided to the packing computational model for generating packing element configuration.

Figure 7A:
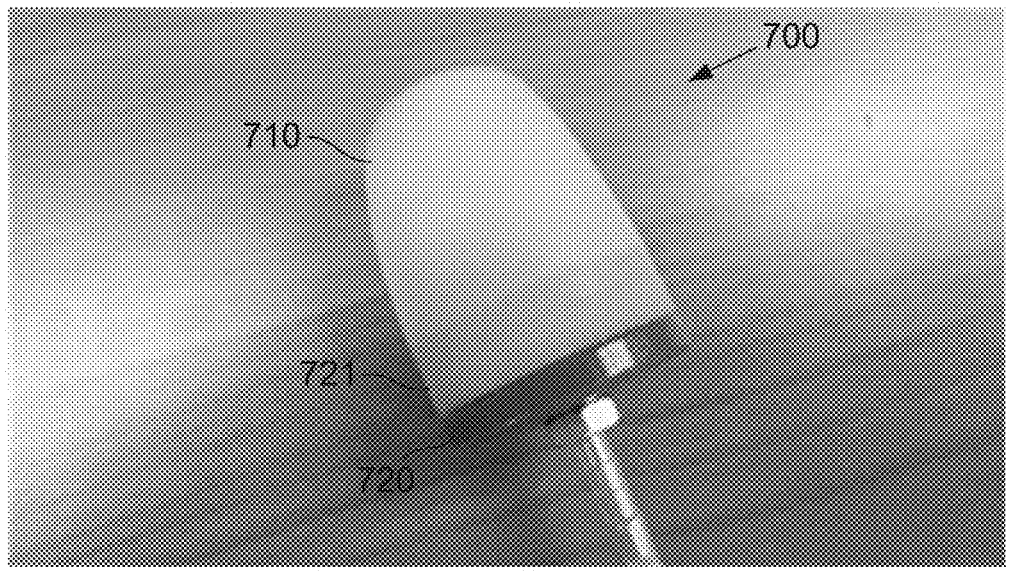
FIGS. 7A to 7C are schematic diagrams of an example of a robotic manipulator.
Figure 7B:
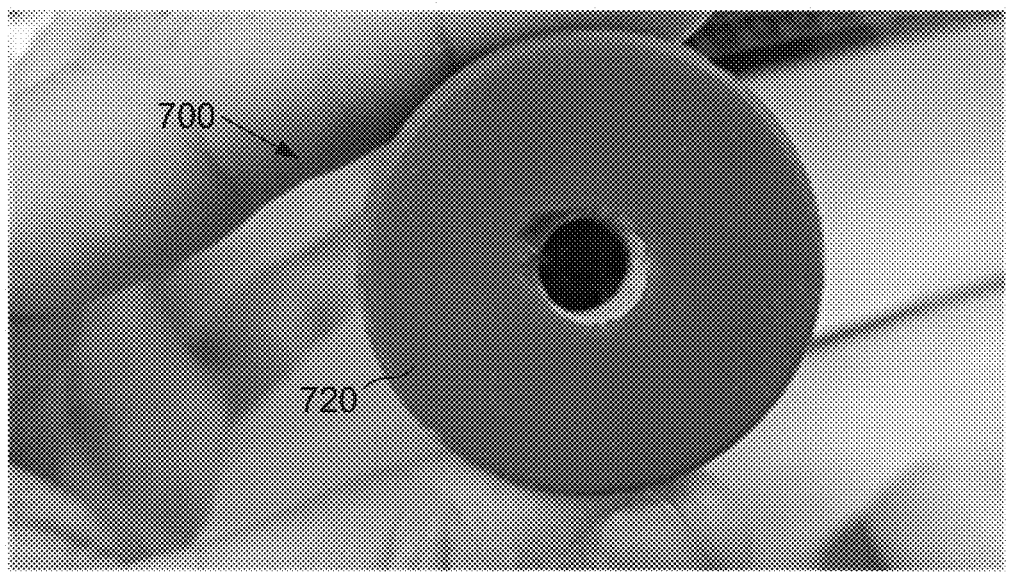
Figure 7C:
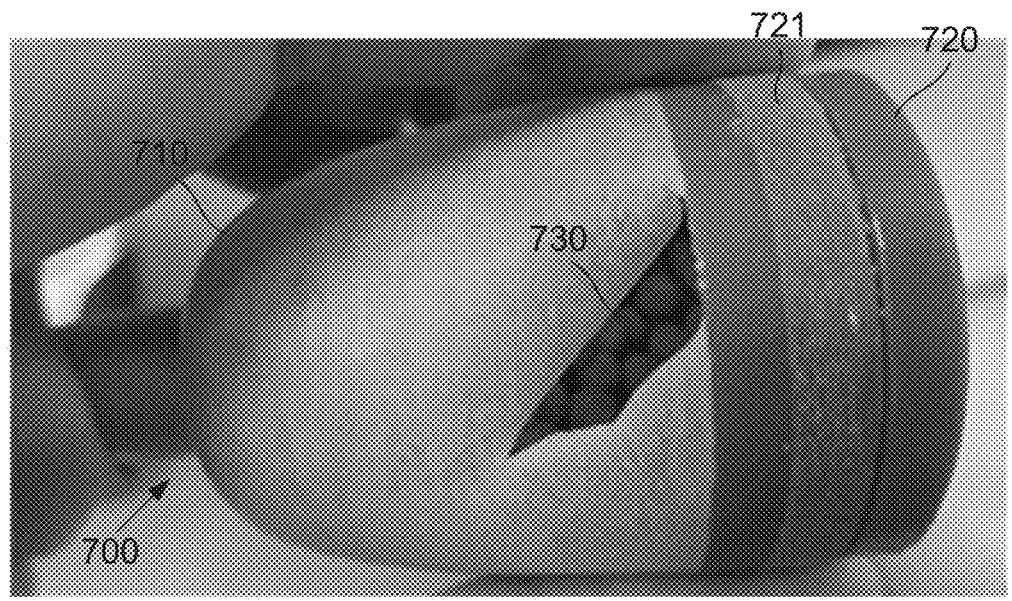

An example of the robotic manipulator is shown in FIGS. 7A to 7C.

FIGS. 7A to 7C show an example of soft robotic manipulator based on high-veracity modelling and evolutionary optimisation of grain shapes, which can be precisely fabricated in a single run on a multi-material 3D printer.

A robotic manipulator 700 includes an outer skin 710, a connector 720 and filling elements 730. The outer skin 710 is made of a flexible material and defining a chamber. The connector 720 is attached to the outer skin 710 and configured to be connected to a fluid pump (not shown) to allow fluid to be added to or removed from the chamber. The filling elements 730 are disposed in the chamber in accordance with a packing element configuration. The robotic gripper 700 is manufactured using a single run additive manufacturing process. The connector 720 further includes a filter 721 for retaining the filling elements 730 within the chamber when in operation.

The manipulator 700 are based on the jamming of granular materials 730, which allows them to switch reversibly between solid-like rigidity and fluid-like plasticity. In practice, an outer skin 710 is of soft rubbery material, which houses numerous grains of material 730 that are of rigid plastic. The grains 730 are constrained to the chamber by a printed filter 721, which screws via a printed thread onto a base plate of the connector 720. The base plate is connected via a length of silicone tube to a vacuum pump.

Jamming is achieved by activating the vacuum pump and removing air from the chamber, which makes the gripper rigid. If pressed onto an object in an unjammed state, the manipulator deforms around the object. Subsequent jamming then causes the manipulator to grip the object, specifically relying on friction between the skin surface and object to retain a grip on the object. The benefit is that the same manipulator can work on many different objects without needing to calculate complex control routines to e.g., there is no need to individually position fingers into a useful grasp pattern.

In one example, multi-objective evolutionary algorithms are used to explore the space of grain shapes, grain stiffness, grain surface roughness and gripper shape and catalogue their performance. Then, the best grain shape, grain stiffness, grain surface roughness and gripper shape are selected and printed for a given manipulator, depending on the preferred properties of the manipulator. The evolutionary algorithms will be described in more details.

This allows single run construction of the entire manipulator, including filter, soft compartment, and all grains. The manipulator is printed in a single print run on a Connex Multimaterial 3D printer. Grains are printed inside the manipulator, attached during printing to neighbouring grains via soluble support material. The support is then washed out of the manipulator after use, leaving the grains inside the compartment. This removes the requirement of manual handling of thousands of grains and automates the entire fabrication process from end-to-end. This also allows rapidly prototyping of different designs whilst removing most of the burden from the human doing so.

This allows precise placement and automated patterning of the packing elements. Software scripts can be developed to pattern any grain shapes desirable at any resolution (depending on print resolution) inside the compartment, which can be any shape desirable. Varying the compartment shape allows us to print not only manipulators, but also 'paws', skins, and so on. As the position of individual grains inside the compartment can be fully specified, bi-disperse filling elements (two grain shapes) can be printed inside the manipulator by sequentially changing the shape and guarantee a completely equal ratio of shape one to shape two. This degree of control during fabrication has not been seen before.

Furthermore, the manipulators may have varying shapes, sizes, performance/functionality, and/or shock-absorbing skins. The soft robotic bodies using functional design of bespoke jamming sections may also achieve capable whole-body behaviours, including morphing and adaptation of form. Additionally, this may be used in manufacturing soft 'paws' for legged robots, allowing better traversal over rough terrain. Moreover, the single run manufacturing process allows fundamental experimentation on the bulk jamming behaviours as the robot can be precisely-fabricated with precisely-placed mixtures of grains.

An example of evolutionary algorithms in the design of a bespoke gripper filled with an optimised granular material will now be described in detail.

Granular materials, such as sands, soils, grains and powders, are ubiquitous in both natural and artificial systems. They are core to many industrial systems from mining and food production to pharmaceuticals and construction. Granular media display unique properties, including their ability to flow like a liquid at low densities and jam in to a solid state at high densities. Granular materials are used functionally in a number of industrial systems, where for example their insulating, energy absorption, filtration or vibration damping properties are variously exploited. A recent emerging industrial application is to utilise the jamming transition of granular matter (transition from a sold to a liquid) to create functional jammed systems such as universal grippers or soft robotic devices with potential broad impact across many industrial sectors. Controlling the microscopic properties of a granular systems to elicit bespoke functionality is challenging due to the complex relationship between the individual particle morphologies and the related emergent behaviour of the bulk state.

Despite their ubiquity, granular materials have thus far largely resisted attempts to create theoretical models capable of accurately predicting their bulk properties based on the properties of the constituent particles and in particular the individual particle shapes. The fine details of the preparation method and small deviations in the properties of the individual particles can lead to large variations in the bulk properties of the material, including significant shifts in packing fraction (the fraction of the space filled by particles), contact number, spatial and orientational ordering (alignment of the particles), segregation, and bulk material strength.

Due to the complex relationship between the properties of the constituent particles and the emergent bulk behaviour of the system, and the resultant lack of available models, little progress has been made in the a priori design of fit for purpose granular materials based on explicit control of individual particle morphologies and interaction properties. However, recent advances in additive manufacturing now presents the ability to easily create and test large quantities of exactly-specified and faithfully-recreated particle morphologies using a broad range of materials with different interaction properties, opening up new avenues in the computational design and physical verification of bespoke granular materials tailored for optimal application-specific performance.

Such applications include robotics, where the jamming of a granular structure can convert parts of robot's body structure from compliant to rigid—useful for shock absorption, locomotion, gripping, morphing, and squeezing into tight spaces. Industrial processes are another target area, where tailored mixtures of granular materials can heighten the efficiency and resultant quality of e.g. powder-bed additive manufacturing processes.

Evolutionary algorithms have previously been shown to be an ideal choice for the exploration of multi-modal, nonlinear search spaces such as those describing the complex relationship for a robotic gripper between the constituent granular material properties, the gripper skin properties, and the flowrate of the attached pump. The granular material properties include size distribution, particle morphologies and particle stiffness. The gripper skin properties include skin material, shape, thickness and patterning on the surface. Here, the following factors are taken into consideration. (i) A robotic gripper skin represented by a nonlinear force field around the containing granular material. This could also be variously represented as, for example, a mesh structure, sets of particles. (ii) A granular material based on parameterised superellipsoids, which enables the gripper to have a huge variety of particle shapes that are guaranteed to be physically instantiable via 3D printing. The particles could be represented by further more complex mathematical functions including multiple SQs representing a single granular particle to represent entirely arbitrary shapes. (iii) Multi-component granular materials, whereby a bulk is comprised of multiple different particle shapes, surface properties, size or stiffness, which may be optimised together.

Results of a computational experiment show the efficient characterisation of gripper properties achieved when a complex design space of particle shapes is searched, and hence confirm the utility of the above described manufacture approach.

Jamming systems can be categorised as laminar (layer) or granular, based on geometric properties of the material that is jammed. Laminar systems comprise multiple thin layers of material, and granular systems comprise a collection of grains or particles. For practical applications, both types of jamming systems are encased in a membrane. Jamming in each case is achieved by evacuating the air from the membrane, creating a vacuum that jams the collection of particles or laminar sheets. Evacuation of air causes stiffening; releasing the vacuum returns the jammed particles to their compliant state.

Both laminar and granular jamming are promising mechanisms with a wide variety of applications, perhaps most promisingly in soft robotics; for the interested reader a review is provided. Laminar jamming has been harnessed to produce compliant, human-safe, general-purpose grippers that naturally deform around the target object, and as a method of tuning the dynamic response of robotic body structures. Laminar jamming has been employed as a tuneable damping mechanism, i.e., as the landing gear of a small UAV, allowing the physical properties of the landing gear to be adjusted in real time according to the landing velocity. Recent work shows the use of laminar jamming as a braking mechanism.

Granular jamming has been employed to create a range of robotic structures, including soft legged robots and universal (object-agnostic) grippers, wherein the target object is impressed into a balloon-like structure containing granular material. In the compliant state, the balloon deforms around the object. Subsequent jamming causes gripping through a stiffening of the gripper. Examples include passive grippers, positive-pressure grippers. Manipulation is also possible through granular jamming soft continuum actuators. Due to its controllable compliance, jamming is particularly successful in medical applications, as e.g., robotic endoscopes and catheters, and as prosthesis.

Despite a burgeoning record of successful applications, many of the more fundamental issues surrounding optimisation of the constituent particles (in terms of shapes, materials, and mixtures) for a particular purpose are poorly understood. This is particularly true for granular jamming, as evidenced by difficulties in modelling the effects of a given particle configuration on properties of the overall jamming mechanism. This motivates our focus into tuning the properties of the particles themselves, opening up a new dimension in the design of high-performance jamming systems for industrial applications.

As design rules for granular systems are notoriously difficult to obtain, evolution has been previously used as a block box optimiser with which to vary particle shape and probe the possibilities of bespoke jamming, or 'Jamming by Design'. Evolution is readily applicable to this task, as Evolutionary Algorithms (EAs) make few assumptions on the underlying structure of the problem, and handle complex, multi-modal optimisation landscapes well. Jaeger et al. have applied evolutionary techniques to investigate the design of particles formed by bonding together sets of overlapping spheres. This demonstrates the ability of this approach to find optimal packing densities within the set of shapes definable by a small finite number of overlapping spheres, and to determine optimal material strengths based on standard measurements, with physical realisations of the simulated particle morphologies obtained using 3D printing.

In the following approach the particle shapes are defined as superellipsoids. This creates a much more complex contact interaction requirement for the simulation when compared to a system of particles composed of overlapping spheres, but enables the curved surface of the particles to be exactly specified as opposed to the rough non-convex surfaces obtained when using sets of overlapping spheres. Using superelipsoids it is also possible to consider a broad range of particle aspect ratios and surface curvatures, with a huge variety of attainable geometries through a smoothly-varying parameterised formulae creating an ideal search space. The optimal morphologies obtained are then also readily able to be 3D printed (no overhangs, easy support material removal), and are less prone to breakage—which is useful in creating robotic grippers.

Figure 8:
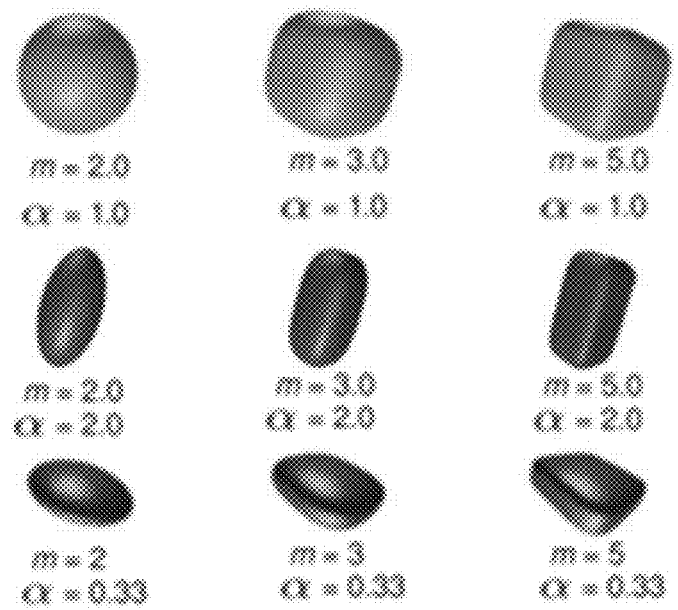
FIG. 8 is a schematic diagram of examples of superellipsoids with different shape parameters and aspect ratios.

In the current example implementation particle shapes are represented as superellipsoids defined by the equation:

$$\left(\frac{x}{a}\right)^m + \left(\frac{y}{b}\right)^m + \left(\frac{z}{c}\right)^m = 1, \quad (1)$$

where: m is the shape parameter, and a, b and c are the particle's semi-major axis lengths (See FIG. 8).

For m=2, we recover the general formula for an ellipsoid, while larger values of m generate increasingly cubic shapes. This gives us the ability to investigate a broad range of particle shapes, smoothly transitioning through a range of surface curvatures and aspect ratios to more easily traverse the fitness landscape. FIG. 8 includes examples of superellipsoids with shape parameter m and aspect ratio α (major-axis lengths a=1, b=1 and c=α).

For the following a Discrete Element Method (DEM) is employed to simulate the particles. The normal force between two contacting particles is given by:

$$F_n = -k_n \xi_n + C_n v_n, \quad (2)$$

where $k_n$ is a spring constant determining the stiffness of the particles, $\xi_n$ is the linear overlap of the particles, $v_n$ is the relative normal velocity and $C_n$ is a constant related to the coefficient of restitution.

The tangential force is given by:

$$F_t = \min\{\mu F_n, k_t \Sigma v_t dt + C_t v_t\}, \quad (3)$$

where the force vector $F_t$ and velocity $v_t$ are defined in the plane tangent to the surface at the contact point, and the summation is performed over the duration of the contact.

The total tangential force, $F_t$, is limited by the maximum Coulomb friction $\mu F_n$, at which point the surface contact shears and the particles begin to slide over one another.

To generate a jammed packing, a set of particles are initially placed at random positions and with random orientations in the bounds of a simulated box with dimension 0.1 m×0.1 m×0.8 m. The system has periodic boundary conditions in the x and y directions (normal to the direction of gravity). The particles are allowed to settle under gravity into a packed state, with the simulation ending when the particles have reached a stationary state.

In one example, the fitness measure considered is the gripper's gripping strength for a specific object shape. The skin of the gripper is represented here as a force field surrounding the filling elements, but may also be simulated using a mathematical model based on for example a static/dynamic mesh structure, a coupled finite element method model, a coupled smooth hydrodynamics model or a set of connected particles. Multiple fitness measures can be optimised at the same time using this technique, for example the shock absorbency of the gripper when loosely packed and the gripping strength when fully jammed. In another example, two fitness measures for the system are considered. The first is the packing fraction Ø, which is fraction of the total volume that the particles occupy. To remove the effects of the boundaries, this is determined in a central region of the packing, removing the top and bottom quartiles of the system. The second fitness function that is evaluated is the primary axis ordering of the grains S. This measures the degree to which the grains primary axes align with each other and is calculated. The packing fraction (or packing density) is critically important in determining the performance of a granular material in an industrial application, with high densities being crucial in the creation of high strength materials including high strength concretes, ceramics, and in other contexts being undesirable for example in applications where high energy dissipation is desired including shock absorbency and vibration reduction. Orientational ordering can also strongly affect the properties of a granular material, with orientational ordering along a single axis as we are considering here can be used to create an exploitable anisotropic response of a material along its different axes. The fitness measures are used as input to our evolutionary algorithm as delineated in the next section.

Figure 9:
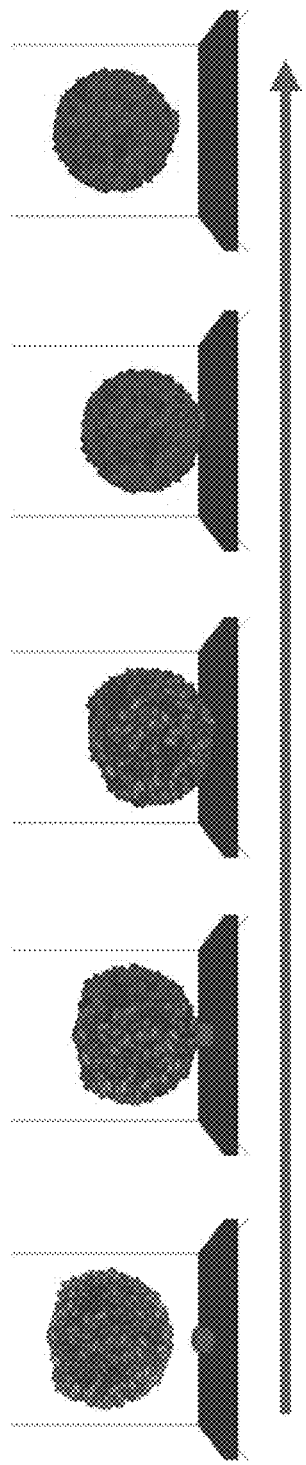
FIG. 9 is a schematic diagram of a robotic manipulator lifting an object.
Figure 10A:
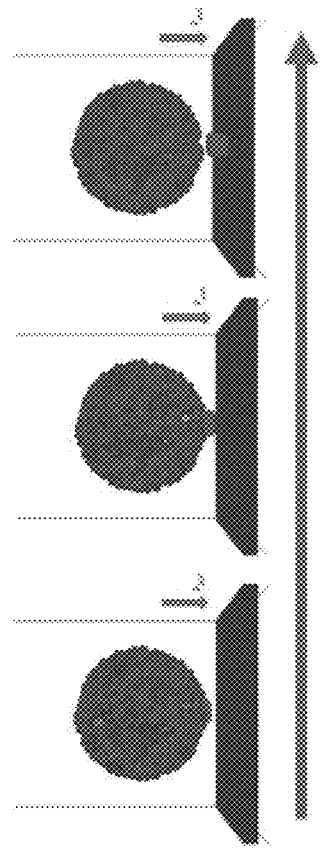
FIG. 10A is a schematic diagram of a robotic manipulator and an object having a pull force applied.
Figure 10B:
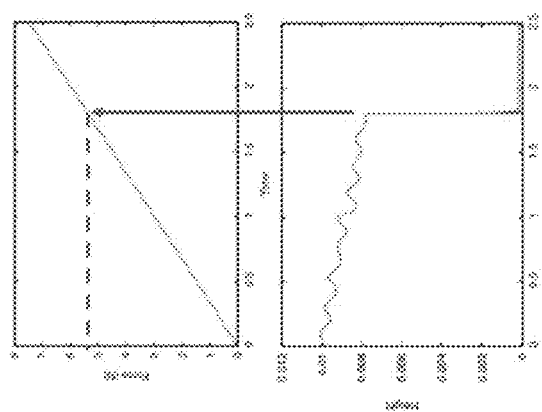
FIG. 10B is graphs showing a linearly pull force being applied to the object and a vertical displacement of the object in FIG. 10A.

A bi-disperse system of superellipsoids and two evolution targets are considered: maximum packing density, Ø, and primary axis orientational ordering S. The system is composed of 9232 particles with a 50:50 mixture of equal volume particles with 2 distinct shapes. Each individual is represented by a vector of 4 continuous variables ($m_1$, $\alpha_1$, $m_2$, $\alpha_2$) which defines the geometry of the particles used based on the super-ellipsoid formula, with the bounds for each parameter given in Table I. The shape factor controlling the angularity of each particle ranges from $m=2:0$ to $m=6:0$, which gives a full range of shapes from perfectly spherical up to a highly cubic shape with rounded corners. The aspect ratio varies from 0:4 to 1:0, giving a broad range of shapes from an equiaxed particle to a highly oblate particle. Additionally, a multi-component system of superellipsoids and the evolution targets of maximum gripping strength is considered. The system is composed of N particles with a mixture of equal volume particles with 2 distinct shapes. Each individual is represented by a vector of X of continuous variables which defines the geometry of the particles is used. For example in the case of a bi-disperse system of equal volume superellipsoids each member would be described by the vector ($m_1$, $a_1$, $b_1$, $m_2$, $a_2$, $b_2$). The simulation of the pickup of a particle is shown in FIG. 9. The assessment of the performance of the specific gripper via an assessment of the grip strength as a linearly increasing pull off force is applied to the gripped object is shown in FIGS. 10A and 10B.

TABLE I

Evolution parameter bounds

| Parameter | Lower Bound | Upper Bound |
|---|---|---|
| $m_1$ | 2.0 | 6.0 |
| $\alpha_1$ | 0.4 | 1.0 |
| $m_2$ | 2.0 | 6.0 |
| $\alpha_2$ | 0.4 | 1.0 |

A computational algorithm, e.g. a multi-objective evolutionary algorithm such as NSGAII, explores the space of functional trade-offs in performance characteristics that can be discovered by varying the parameterisation of our superellipsoidal particles. In one example, the process starts with creation of an initial population of N=30 individuals, with each parameter instantiated random-uniformly within their bounds. Each individual is evaluated and fitness measures recorded. For each of our 100 generations, 30 children are created and evaluated, and compete with their corresponding parent for a place in the subsequent generation. In another example, the process starts with creation of an initial population of N individuals, each individual representing an equal mixture of two parameterised granular shapes. Each individual is evaluated and performance metrics (one fitness value per objective i) recorded. At each generation, a set of offspring individuals are created from the population. Offspring are tested and assigned fitness, one fitness score per objective m.

A multi-objective NSDE is used, which is a variation of NSGA-II using the crossover and mutation operators from Differential Evolution. NSDE is selected for its efficiency in traversing real-valued search spaces. NSDE explores the space of functional trade-offs that can be discovered by varying the parameterisation of our superellipsoidal particles.

At each generation, after fitness evaluation, a new set of individuals is generated for testing. Each parent p creates a child c by probabilistically selecting elements of a donor vector d, given by:

$$d = r3 + F(r1 - r2), \quad (4)$$

to replace some elements of p, where r1, r2, and r3 are unique randomly-selected individuals from the population. The main DE parameters are differential weight F=0.8, and crossover rate CR=0.5, selected following a parameter search.

For each vector index i, $c_i = d_i$ if i==R, or rand<CR, otherwise $c_i = p_i$. rand is a random-uniform number [0,1], and R is a random vector index such that c≠p. When every parent has generated a child, each child is assessed and assigned one fitness value per objective based on the performance of the grain shapes when modelled.

The population is then sorted into a number of fronts. Every individual that is non-dominated (better at at least one objective than every other individual) is added to the first front $F_1$. The process is repeated for all individuals not in $F_1$, which are added to $F_2$. This continues until all members belong to a front.

The population is then fitness-ranked for each objective m. Each individual is assigned a crowding distance $d_c$ per m, as the difference between the fitnesses of its immediate neighbours, normalised in the range of observed fitnesses for that objective. The first and last individuals in each front have $d_c = \infty$. The fronts $F_x$ are ranked based the summed $d_c$ of every individual in the front, and the new population is recreated to the original population size N by adding individuals from the lowest-ranked $F_x$ to the highest in turn, in order of descending $d_c$. A generation consists of the above-described steps. These steps are repeated G times, until a satisfactory level of performance, or some computational budget, is reached.

Figure 11:
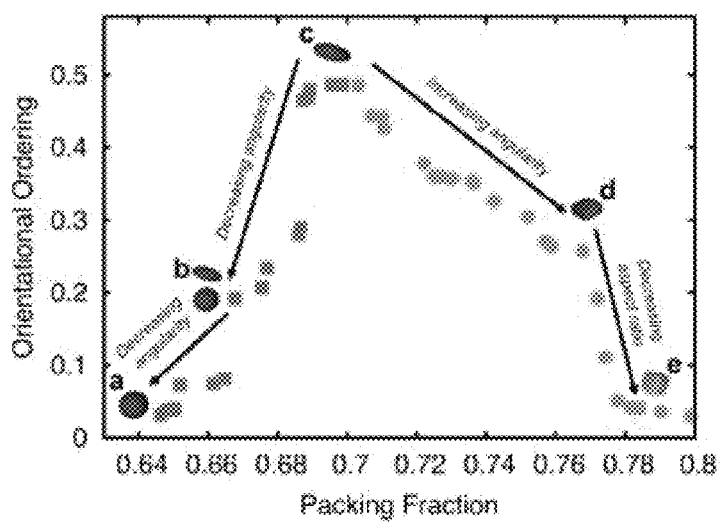
FIG. 11 is a graph showing grain shapes and corresponding packing fractions; and, FIG. 12 is a graph showing granular packings at multiple points along the Pareto fronts according to the packings a, b, c, d, and e points in FIG. 11.

In this example, the above can be used to determine the optimal trade-off between packing density Ø and orientational ordering S of the primary axes of a broad range of shapes for a bi-disperse (two shapes with equal volumes) system of nonspherical grains. Two cases were considered: firstly maximising both S and Ø, and secondly seeking to maximise S and minimise Ø. The Pareto front for both cases after the evolution of 100 generations is shown in FIG. 11. FIG. 11 is a plot of the Pareto fronts when maximising orientational ordering and minimising packing fraction (orange squares) and maximising packing fraction (green circles). The shapes of the grains that generate the Pareto optimal packings at 5 points a, b, c, d and e are shown along with labels indicating the primary variations in the particle shapes along the different sections of the Pareto fronts.

The evolutionary algorithm finds the lowest packing density at just over Ø=0.64 is obtained for a system where both species are set to the same shape of a perfect sphere ($m_1=m_2=2.0$ and $\alpha_1=\alpha_2=1.0$) at point (a) labelled on FIG. 11. As this shape has no unique primary axis, the axes of the grains are completely randomly orientated with respect to each other, with S<0.05. The system with the strongest alignment of the primary axes of the grains is again monodisperse, with ellipsoids at the most extreme aspect ratio considered ($m_1=m_2=2.0$ and $\alpha_1=\alpha_2=0.4$) at point (c) on FIG. 11.

The high aspect ratio gives a strong preference for the grains to lie flat due to the influence of gravity, with their primary axis aligning in the direction of the gravity vector. Transitioning from point (c) to point (a) along the Pareto front goes through a range of bi-disperse packings, all of which have both species with almost exactly $m_1=m_2=2.0$ (with the highest observed shape factor found to be m=2.08), but strong independent variation in the aspect ratios of both species. Between points (c) and (b) one of the species is always at the most extreme aspect ratio of $\alpha=0.4$ and the other smoothly decreases until point (b) where $\alpha_1=1.0$ and $\alpha_2=0.4$ (corresponding to a mixture of perfect spheres and the highest aspect ratio ellipsoids). Then going from point (b) to point (a) the aspect ratio of the second species also decreases until both shapes are perfectly spherical at point (a).

Next, considering the case where both Ø and S are maximised, going from point (c) to point (e) in FIG. 11. For this case, the Pareto front was found to always be composed of packings with a single particle shape. The highest density packing was obtained for the most cubic shape with the equal axis lengths ($m_1=m_2=6.0$ and $\alpha_1=\alpha_2=1.0$) at point (e), and this also corresponded to the lowest primary axis ordering, as each of the axes are entirely equivalent and so there is no driver in the system for a unique axis alignment to occur. This system does however display strong cubatic alignment of the grains (alignment of any axis of a grain with any axis of another grain), but this type of alignment would not produce the kind of anisotropic material response that we are specifically evolving towards in this study. In transitioning along the Pareto front from point (c) to point (d), the angularity of the grains increases from m=2.0 to m=6.0, while the aspect ratios are maintained at a their most extreme value of and $\alpha=0.4$. The packing at point (d) again shows a high degree of alignment, with the emergence of columnar phase due to the strong alignment driver of the primary axes and a significant second contribution from the flat faces normal to the other two axes also having a tendency to generate alignment. From point (d) to point (e) the shape factor remains at it is maximum value of m=6.0 and the aspect ratio smoothly decreases to $\alpha=1.0$.

Figure 12:
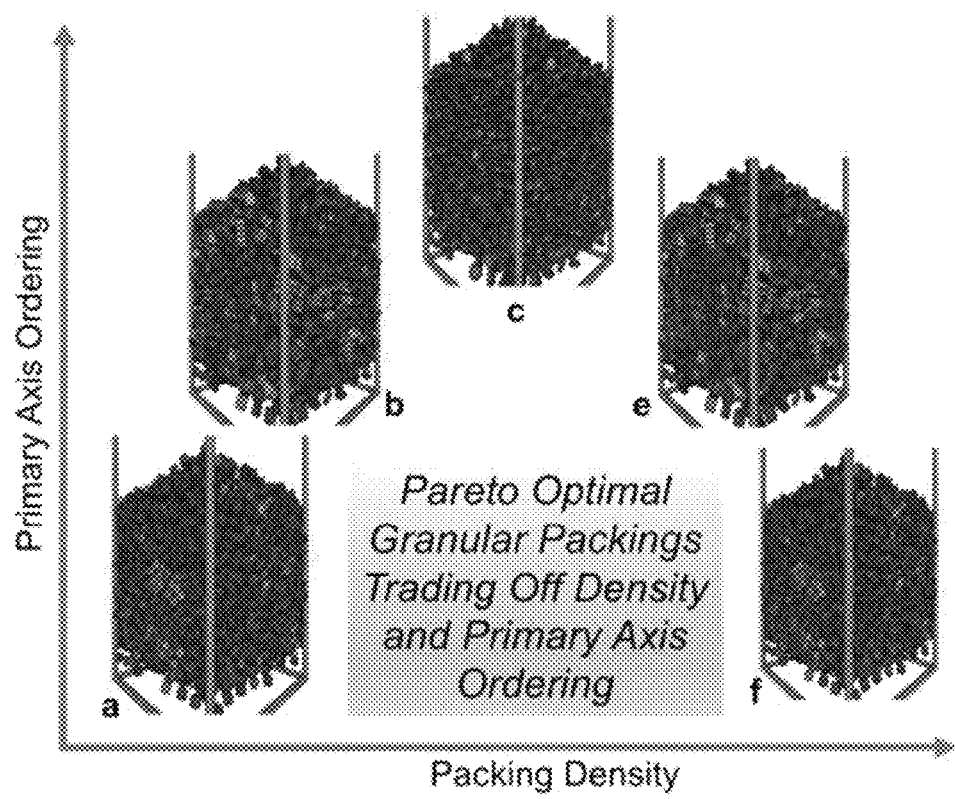

Images of the packings obtained at the key points (a), (b), (c), (d) and (e) along the Pareto fronts are shown in FIG. 12.

The evolutionary algorithm iteratively explores the parameter space, improving both the maximum and mean fitness of the population of candidate solutions, converging on final filling element shapes that balance the relative contributions of surface curvature and aspect ratio for each species. This approach can be used to optimise any desired properties of the gripper.

Thus, this approach allows the robotic manipulator to be manufactured using 3D printing technique with a high degree of control of the resulting manipulator properties. The process allows robotic manipulator to have a precise packing element configuration as desired, and thereby delivers optimal manipulator properties. Furthermore, the packing element configuration is determined by computational model, so that desirable manipulator properties can be better translated to packing element configurations to be manufactured. Advantageously, additive manufacturing processes allow manufacturing cost and time to be reduced. As the cost and time is reduced, it may not be a priority to extend the durability of the manipulator, so that an optimal manipulator function can be delivered. Alternatively, the durability of the manipulator may be extended by printing the filling element shapes with rounded corners and/or slightly thicker outer skin. Additive manufacturing processes also reduce manufacturing errors or minimise quality control spend. Accordingly, the robotic manipulator can be replaced or repaired easily by printing an entire manipulator or a part of the manipulator. This allows the manipulators to be designed and manufactured to be more effective to the intended application and manufactured more easily, allowing these to be deployed more widely.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means ±20%.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The invention claimed is:

1. A method of manufacturing a robotic manipulator, wherein the method includes, in one or more processing devices:
    a) determining desired manipulator properties including a manipulator shape and manipulator jamming properties;

b) using the manipulator jamming properties and a packing computational model to determine a packing element configuration, the packing computational model defining relationships between the manipulator jamming properties and different packing element configurations, and the packing element configuration defining at least one of:
   i) a number of filling elements;
   ii) filling element shapes;
   iii) filling element sizes;
   iv) filling element material composition;
   v) filling element surface roughness and roughness locations; and,
   vi) a proportion of filling elements of each size and shape;
c) controlling an additive printing machine in accordance with the packing element configuration and manipulator shape to thereby manufacture the robot manipulator, wherein the robot manipulator includes:
   i) an outer skin, the skin being made of a flexible material and defining a chamber;
   ii) a connector attached to the outer skin and configured to be connected to a fluid pump to allow fluid to be added to or removed from the chamber;
   iii) filling elements disposed in the chamber in accordance with the packing element configuration.

2. A method according to claim 1, wherein the manipulator jamming properties include at least one of:
   a) a manipulator stiffness; and,
   b) a manipulator jamming force.

3. A method according to claim 1, wherein the method includes, in the one or more processing devices, using the manipulator shape to determine the packing element configuration.

4. A method according to claim 1, wherein the packing element configuration defines filling element locations and wherein the method includes, in the one or more processing devices, positioning the filling elements within the chamber in accordance with the filling element locations.

5. A method according to claim 4, wherein the packing element configuration defines a mesh shape and location, and wherein the method includes, in the one or more processing devices, controlling the additive printing machine to create at least one mesh in accordance with the mesh shape and location.

6. A method according to claim 5, wherein the mesh is configured to retain filling elements in the filling element locations.

7. A method according to claim 1, wherein the method includes, in the one or more processing devices:
   a) determining an outer skin configuration using the manipulator shape, the outer skin configuration defining at least one of:
      i) outer skin shape;
      ii) outer skin size;
      iii) outer skin material;
      iv) outer skin flexibility;
      v) outer skin structure;
      vi) outer skin surface feature; and,
   b) controlling the additive printing machine in accordance with the outer skin configuration to manufacture the outer skin of the robotic manipulator.

8. A method according to claim 1, wherein the method includes, in the one or more processing devices, at least one of:
   a) selecting the manipulator shape at least one of:
      i) in accordance with user input commands;
      ii) from a number of predefined shapes; and,
      iii) in accordance with an intended manipulator use;
   b) determining manipulator use parameters based on the intended manipulator use; and,
   c) determining the manipulator properties using the manipulator use parameters.

9. A method according to claim 8, wherein the method includes, in the one or more processing devices, at least one of:
   a) using the manipulator use parameters and a manipulator computational model to determine at least some of the manipulator properties, the manipulator computational model defining relationships between the manipulator use parameters and different manipulator properties;
   b) controlling the additive printing machine to create a filter to retain the filling elements within the chamber as fluid is added to or removed from the chamber;
   c) controlling the additive printing machine to laminate the outer skin onto the connector;
   d) controlling the additive printing machine to manufacture filling elements from a photopolymer; and,
   e) determining the packing element configuration by defining the filling element shapes, wherein the filling element shapes include superquadrics.

10. A method according to claim 8, wherein, for lifting an object, the manipulator use parameters include at least one of:
   a) an object size;
   b) an object type;
   c) an object weight;
   d) an object shape; and,
   e) an object surface properties.

11. A system for use in manufacturing a robotic manipulator, the system including one or more processing devices configured to:
   a) determine desired manipulator properties including a manipulator shape and manipulator jamming properties;
   b) use the manipulator jamming properties and a packing computational model to determine a packing element configuration, the packing computational model defining relationships between the manipulator jamming properties and different packing element configurations, and the packing element configuration defining:
      i) a number of filling elements;
      ii) filling element shapes;
      iii) filling element sizes;
      iv) filling element material composition;
      v) filling element surface roughness and roughness locations; and,
      vi) a proportion of filling elements of each size and shape;
   c) control an additive printing machine in accordance with the packing element configuration and manipulator shape to thereby manufacture the robot manipulator, wherein the robot manipulator includes:
      i) an outer skin, the skin being made of a flexible material and defining a chamber;
      ii) a connector attached to the outer skin and configured to be connected to a fluid pump to allow fluid to be added to or removed from the chamber;

iii) filling elements disposed in the chamber in accordance with the packing element configuration.

12. A system according to claim 11, wherein the manipulator jamming properties include at least one of:
   a) a manipulator stiffness; and,
   b) a manipulator jamming force.

13. A system according to claim 11, wherein the one or more processing devices are configured to use the manipulator shape to determine the packing element configuration.

14. A system according to claim 11, wherein the packing element configuration defines filling element locations and wherein the one or more processing devices are configured to position the filling elements within the chamber in accordance with the filling element locations.

15. A system according to claim 14, wherein the packing element configuration defines a mesh shape and location, and wherein the one or more processing devices are configured to control the additive printing machine to create at least one mesh in accordance with the mesh shape and location.

16. A system according to claim 15, wherein the mesh is configured to retain filling elements in the filling element locations.

17. A system according to claim 11, wherein the one or more processing devices are configured to:
   a) determine an outer skin configuration using the manipulator shape, the outer skin configuration defining at least one of:
      i) outer skin shape;
      ii) outer skin size;
      iii) outer skin material;
      iv) outer skin flexibility;
      v) outer skin structure;
      vi) outer skin surface feature; and,
   b) control the additive printing machine in accordance with the outer skin configuration to manufacture the outer skin of the robotic manipulator.

18. A system according to claim 11, wherein the one or more processing devices are configured to at least one of:
   a) select the manipulator shape at least one of:
      i) in accordance with user input commands;
      ii) from a number of predefined shapes; and,
      iii) in accordance with an intended manipulator use;
   b) determine manipulator use parameters based on the intended manipulator use; and,
   c) determine the manipulator properties using the manipulator use parameters.

19. A system according to claim 18, wherein the one or more processing devices are configured to at least one of:
   a) use the manipulator use parameters and a manipulator computational model to determine at least some of the manipulator properties, the manipulator computational model defining relationships between the manipulator use parameters and different manipulator properties;
   b) control the additive printing machine to manufacture the robot manipulator, wherein the robot manipulator including the connector further includes a filter to retain the filling elements within the chamber as fluid is added to or removed from the chamber;
   c) control the additive printing machine to manufacture the robot manipulator, wherein the robot manipulator includes the outer skin being laminated onto the connector; and,
   d) determine the packing element configuration defining the filling element shapes, wherein the filling element shapes include superquadrics.

20. A system according to claim 18, wherein, for lifting an object, the manipulator use parameters include at least one of:
   a) an object size;
   b) an object type;
   c) an object weight;
   d) an object shape; and,
   e) an object surface properties.

* * * * *